US012415712B2

(12) United States Patent
Chien et al.

(10) Patent No.: US 12,415,712 B2
(45) Date of Patent: Sep. 16, 2025

(54) POSITIONING AND CARRYING STRUCTURE, AUTOMATED GUIDED VEHICLE AND LOADING SYSTEM

(71) Applicant: FOXSEMICON INTEGRATED TECHNOLOGY, INC., Miao-Li Hsien (TW)

(72) Inventors: An-Fu Chien, Miaoli Hsien (TW); Chen-Yi Liao, Miaoli Hsien (TW)

(73) Assignee: FOXSEMICON INTEGRATED TECHNOLOGY, INC., Miao-Li Hsien (TW)

( * ) Notice: Subject to any disclaimer, the term of this patent is extended or adjusted under 35 U.S.C. 154(b) by 484 days.

(21) Appl. No.: 17/897,530

(22) Filed: Aug. 29, 2022

(65) Prior Publication Data

US 2023/0073066 A1 Mar. 9, 2023

(30) Foreign Application Priority Data

Sep. 9, 2021 (CN) ............................ 202111056186

(51) Int. Cl.
*B66F 9/18* (2006.01)
*B66F 9/19* (2006.01)

(52) U.S. Cl.
CPC ................ *B66F 9/195* (2013.01); *B66F 9/18* (2013.01)

(58) Field of Classification Search
CPC ...... H01L 21/67724; B66F 9/183; B66F 9/18; B66F 9/195
See application file for complete search history.

(56) References Cited

U.S. PATENT DOCUMENTS

| | | | | |
|---|---|---|---|---|
| 3,971,585 | A * | 7/1976 | LaBudde ................ | B66F 9/183 294/902 |
| 9,695,023 | B1 * | 7/2017 | Kirkpatrick ............. | B66F 9/183 |
| 2022/0193845 | A1 * | 6/2022 | Trenkle ................... | B66F 9/195 |
| 2024/0140769 | A1 * | 5/2024 | Piani ......................... | B66F 9/19 |

* cited by examiner

*Primary Examiner* — Mark C Hageman
(74) *Attorney, Agent, or Firm* — ScienBiziP, P.C.

(57) ABSTRACT

A carrier applying precision support and lifting by an Automated Guided Vehicle includes a frame, two supporting arms, and pressing components. Two supporting arms are located on either side of the frame and are movable in a receiving direction relative to the frame. The pressing components are located on the frame, the pressing components include first pressure balls, for pushing the supporting arms across the carrier, and second pressure balls for pushing the supporting arms along the receiving direction. The first and second balls improve the positioning accuracy of the supporting arms relative to the object or material to be transported and reduces friction between the supporting arms and the pressing components. An AGV cart and a loading system are also disclosed.

19 Claims, 5 Drawing Sheets

100

POSITIONING AND CARRYING STRUCTURE, AUTOMATED GUIDED VEHICLE AND LOADING SYSTEM

FIELD

The subject matter herein generally relates to materials handling, and to carrier, AGV cart and loading system.

BACKGROUND

In industrial production, the AGV cart commonly carries materials and delicate objects. However, the position of the materials may be different each time, resulting in low positioning accuracy and thus a risk of the materials being shed or damaged.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
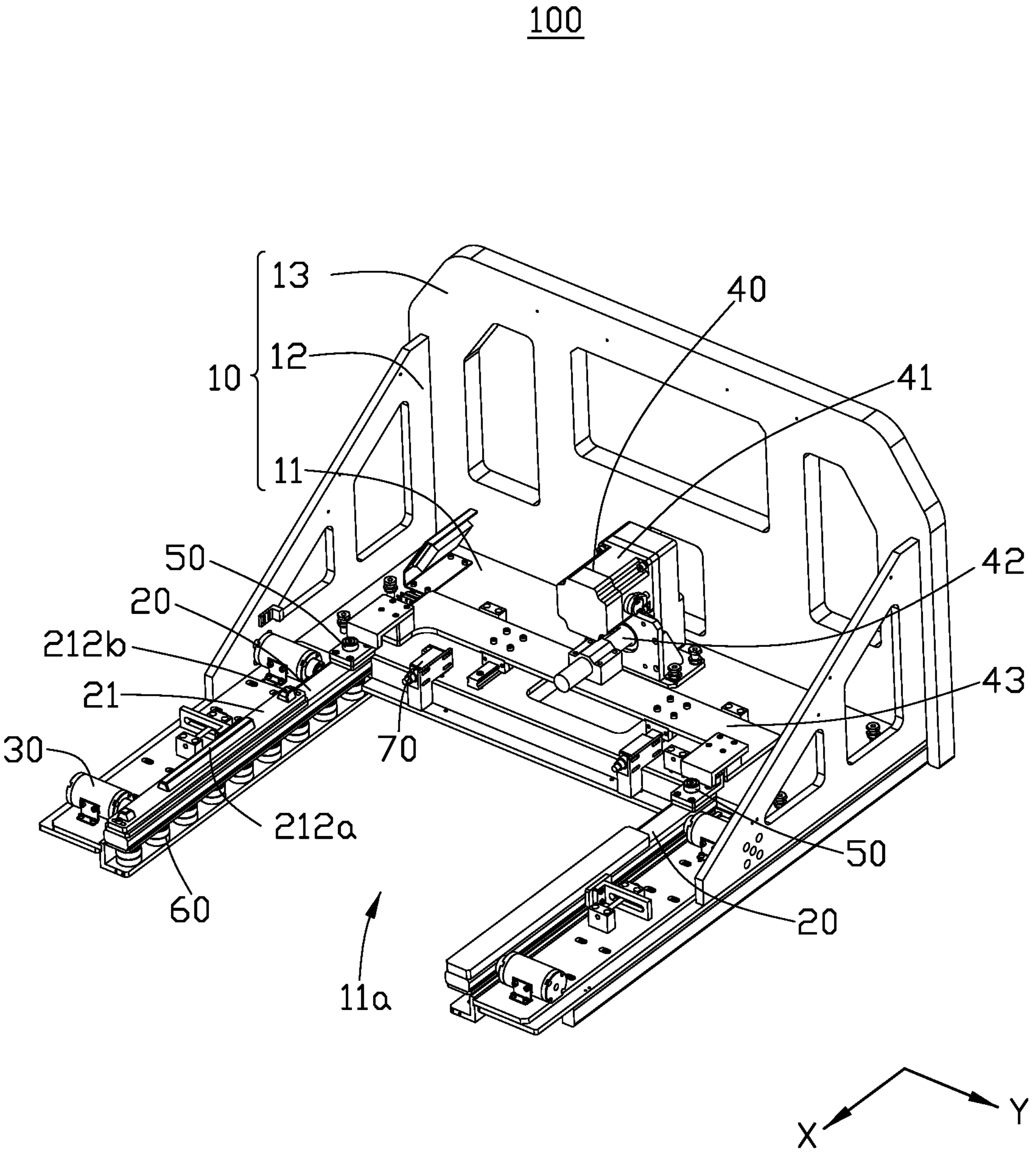
FIG. 1 is an isometric view of a materials carrier according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to “an” or “one” embodiment in this disclosure are not necessarily to the same embodiment, and such references mean “at least one.”

The term “coupled” is defined as connected, whether directly or indirectly through intervening components, and is not necessarily limited to physical connections. The connection can be such that the objects are permanently connected or releasably connected. The term “comprising” means “including, but not necessarily limited to”; it specifically indicates open-ended inclusion or membership in a so-described combination, group, series, and the like.

Without a given definition otherwise, all terms used have the same meaning as commonly understood by those skilled in the art. The terms used herein in the description of the present disclosure are for the purpose of describing specific embodiments only, and are not intended to limit the present disclosure.

Figure 2:
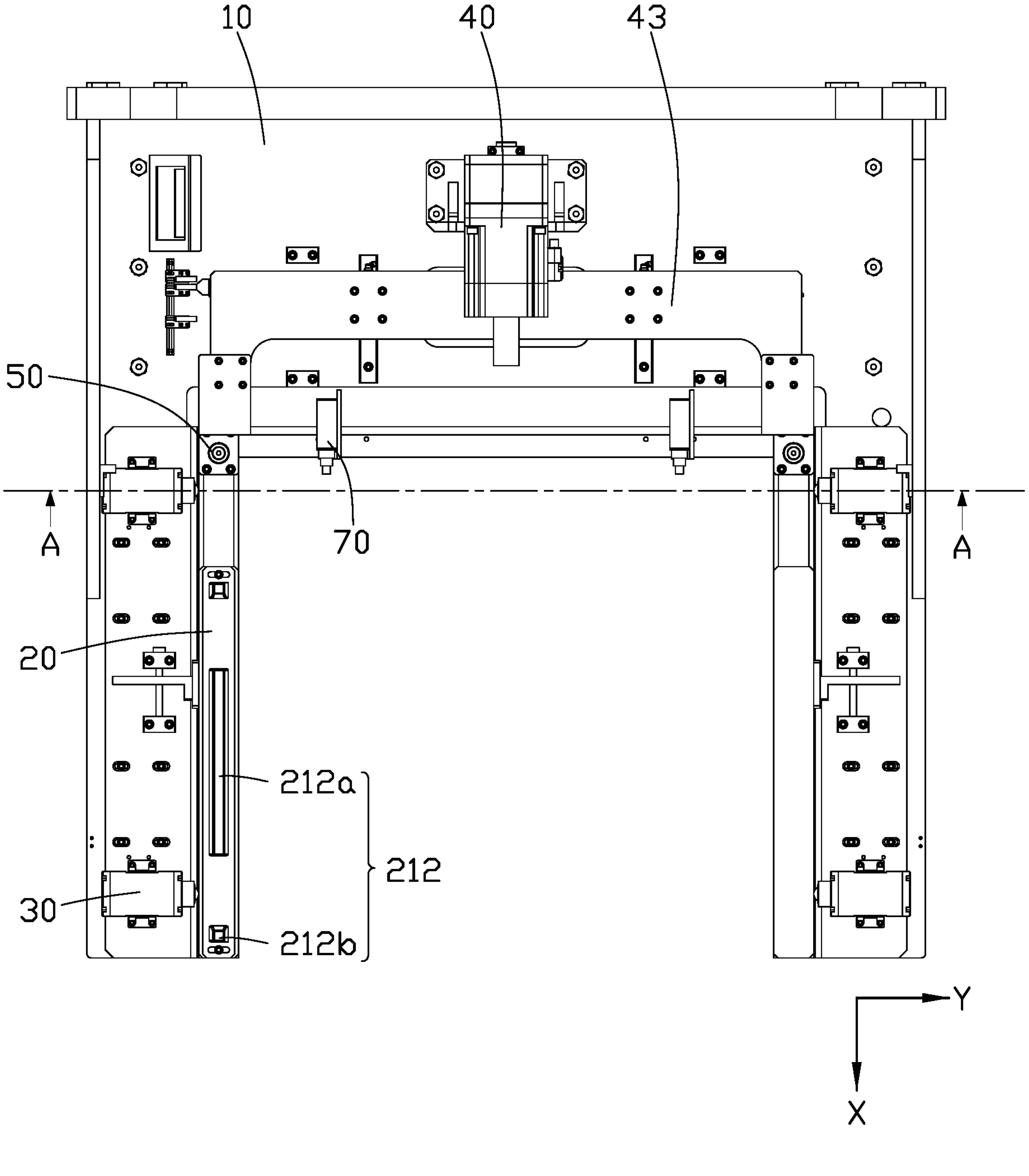
FIG. 2 is a top view of the carrier according to an embodiment of the present disclosure.
Figure 3:
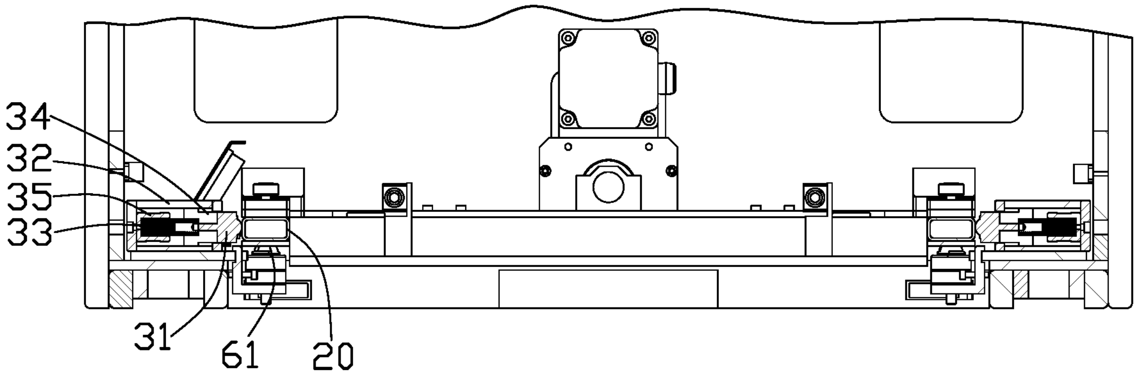
FIG. 3 is a front view of the carrier according to an embodiment of the present disclosure.

As shown in FIG. 1 to FIG. 3, a structure (carrier 100) to take a precision hold of and transport industrial materials on an Automated Guided Vehicle (AGV) of an embodiment includes a frame 10, at least two supporting arms 20 and at least one press component 30. The frame 10 includes horizontal board 11, stiffener 12, and vertical board 13. The horizontal board 11 is provided with an opening 11*a*. The opening 11*a* is configured for containing an object to be transported. The stiffener 12 is configured for improving the overall strength of the connection of horizontal board 11 and vertical board 13. The supporting arms 20 and the press component 30 are installed on the horizontal board 11. The vertical board 13 is configured for installing the carrier 100.

As shown in FIG. 1 to FIG. 3, the two supporting arms 20 are extended along direction X, and arranged side by side in direction Y. The direction Y is perpendicular to the direction X. The two supporting arms 20 are movable relative to the horizontal board 11 along the horizontal direction X. The two supporting arms 20 are on either side of the opening 11*a*. The two supporting arms 20 support and hold an object together.

The carrier 100 also includes a drive mechanism 40. The drive mechanism 40 is configured for driving the supporting arms 20 to move along direction X. The drive mechanism 40 includes a motor 41, a transmission assembly 42, and a moving arm 43. The motor 41 and the transmission assembly 42 are mounted on the horizontal board 11. The moving arm 43 is movable relative to the frame 10 along the direction X. The transmission assembly 42 is connected to the motor 41 and the moving arm 43, and converts the rotation of the motor 41 into movement of the moving arm 43. The moving arm 43 is connected to the two supporting arms 20, and the supporting arms 20 and moving arm 43 can be moved simultaneously. As an example, the distance of movement of the supporting arms 20 is 0-30 mm.

As shown in FIG. 1 to FIG. 3, in some embodiments, the transmission assembly 42 can be a timing belt, a gear, etc., and the output end of the transmission assembly 42 is a screw, which moves the moving arm 43 along the direction X.

In some embodiments, a gap is defined between the moving arm 43 and each supporting arm 20 in the direction X to allow positional adjustment of the supporting arm 20 relative to the moving arm 43. An adjusting bolt 50 connects the moving arm 43 and the supporting arm 20, to fix the position of the supporting arm 20 relative to the moving arm 43. The adjusting bolt 50 can be made tighter or looser manually. When the adjusting bolt 50 is loosened, the position of the unlocked supporting arm 20 can be adjusted slightly. In a preferred position of the supporting arm 20, the adjusting bolt 50 can be tightened to fix and lock the supporting arm 20 in that position, which improves the positioning accuracy of the supporting arm 20 relative to the object to be transported.

In some embodiments, a positioning plate 21 is located on each supporting arm 20. The positioning plate 21 can move along the direction Y. The positioning plate 21 is provided with at least one positioning column 212. The positioning column 212 is configured for positioning the object to be transported, so as to improve the stability of the material.

Figure 4:
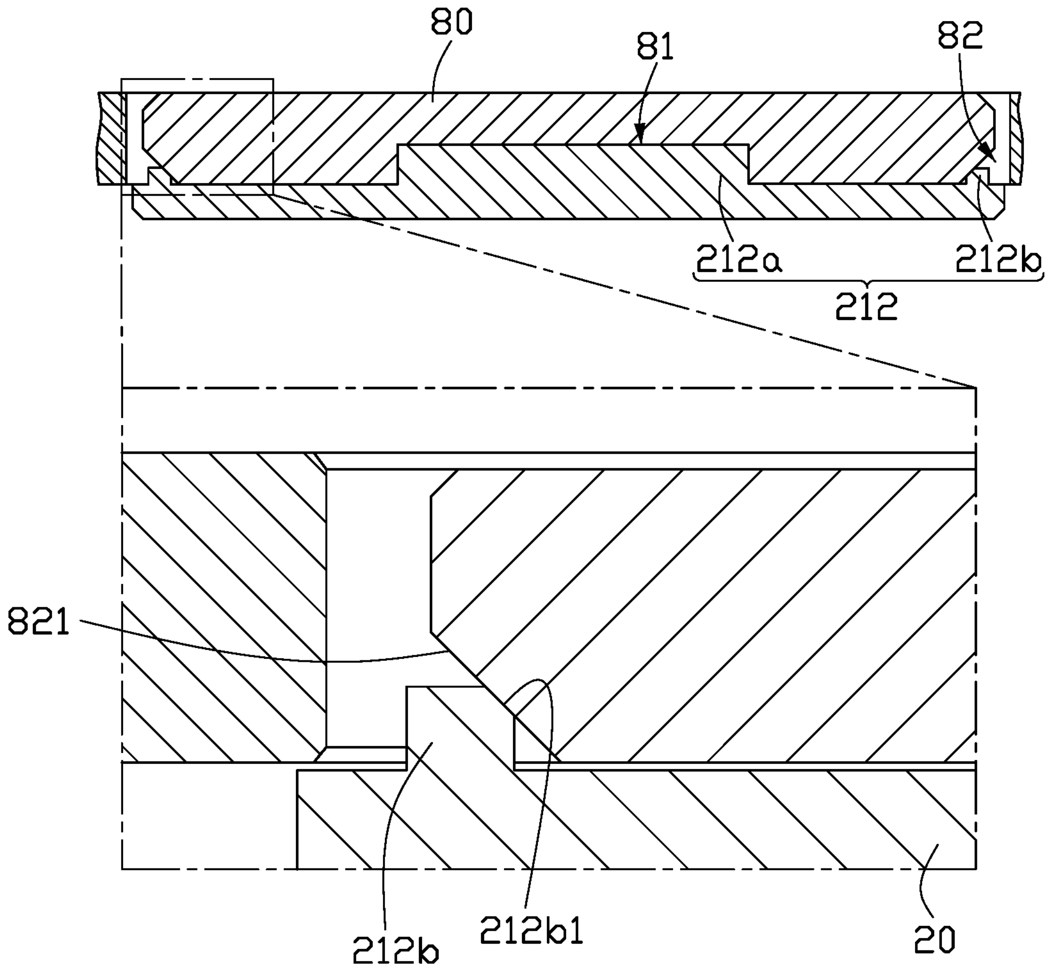
FIG. 4 is a cross-sectional view along line A-A in FIG. 2.

As shown in FIG. 4, in some embodiments, the object for transportation is a fixture 80. The fixture 80 is a structure configured for fixing a workpiece or material stably in a certain orientation. The fixture 80 is provided with at least one positioning groove on both sides. There may be two kinds of positioning column 212, one a long column 212*a*, the other a short column 212*b*. One long column 212*a* and two short columns 212*b* are mounted on each supporting arm 20 and arranged along the direction X. The long column 212*a* is located between the two short columns 212*b*. There may also be two kinds of positioning groove, one a long groove 81, the other a short groove 82. Each side of the fixture 80 along the direction Y each is provided with one long groove 81 and two short grooves 82. The long groove 81 is between the two short grooves 82. The positions of the long column 212*a* and the long groove 81 correspond one-to-one, and the positions of the short columns 212*b* and the short grooves 82 also correspond one-to-one. The long column 212*a* can be inserted into the long groove 81, and the short columns 212*b* can be inserted into the short groove 82.

In some embodiments, the two short grooves 82 are located at opposite ends of one side of the fixture 80. A first slope 821 is formed in each short groove 82. Each short column 212*b* is provided with a second slope 212*b*1 going upwards. The inclination of the first slope 821 is equal to the inclination of the second slope 212*b*1. When the short column 212*b* is inserted into the short groove 82, the second slope 212*b*1 rests against the first slope 821, limiting the position of the fixture 80.

As shown in FIG. 1 and FIG. 3, the carrier 100 includes four press components 30. Two press component 30 are located on each supporting arm 20, each being close to an end of the arm 20. Each press component 30 includes a first ball 31. The first ball 31 can push the supporting arm 20 along the direction Y, to improve the positioning accuracy between the supporting arm 20 and the fixture 80 and the consequent stability of transportation, and friction between the press component 30 and the supporting arm 20 is also reduced.

In some embodiments, each press component 30 includes a shell 32, an elastic member 33, and a guidepost 34. The elastic member 33 and the guidepost 34 are accommodated in the shell 32. One end of the elastic member 33 rests against the inner wall of the shell 32, and the other end bears against the guidepost 34. The end of the guidepost 34 away from the elastic member 33 is connected with the first ball 31, which can move the shell 32 along the direction Y. As an example, the range of movement of the first ball 31 is 0-15 mm.

In some embodiments, each press component 30 also includes a spring cover 35. The elastic member 33 is a spring. The spring cover 35 is accommodated in the shell 32. One end of the elastic member 33 is held in the spring cover 35, for stability of the elastic member 33.

In some embodiments, the frame 10 is provided with four adjusting grooves, each shell 32 is inserted in one adjusting groove to allow the press component 30 to change position relative to the frame 10 along the direction Y.

In some embodiments, the carrier 100 also includes a plurality of support components 60. Support components 60 are arranged on the frame 10 along the direction X below each supporting arm 20. Support components 60 are configured for supporting the supporting arm 20. Each support component 60 includes a second ball 61. The second ball 61 is located below the supporting arm 20 and supports the bottom of the supporting arm 20. A plurality of second balls 61 can improve the stability of the supporting arm 20 and reduces friction between the supporting arm 20 and the support components 60.

In some embodiments, a limit switch 70 is located on the frame 10 between the two supporting arms 20. The limit switch 70 can sense the object to be carried, so as to improve the positioning accuracy.

Figure 5:
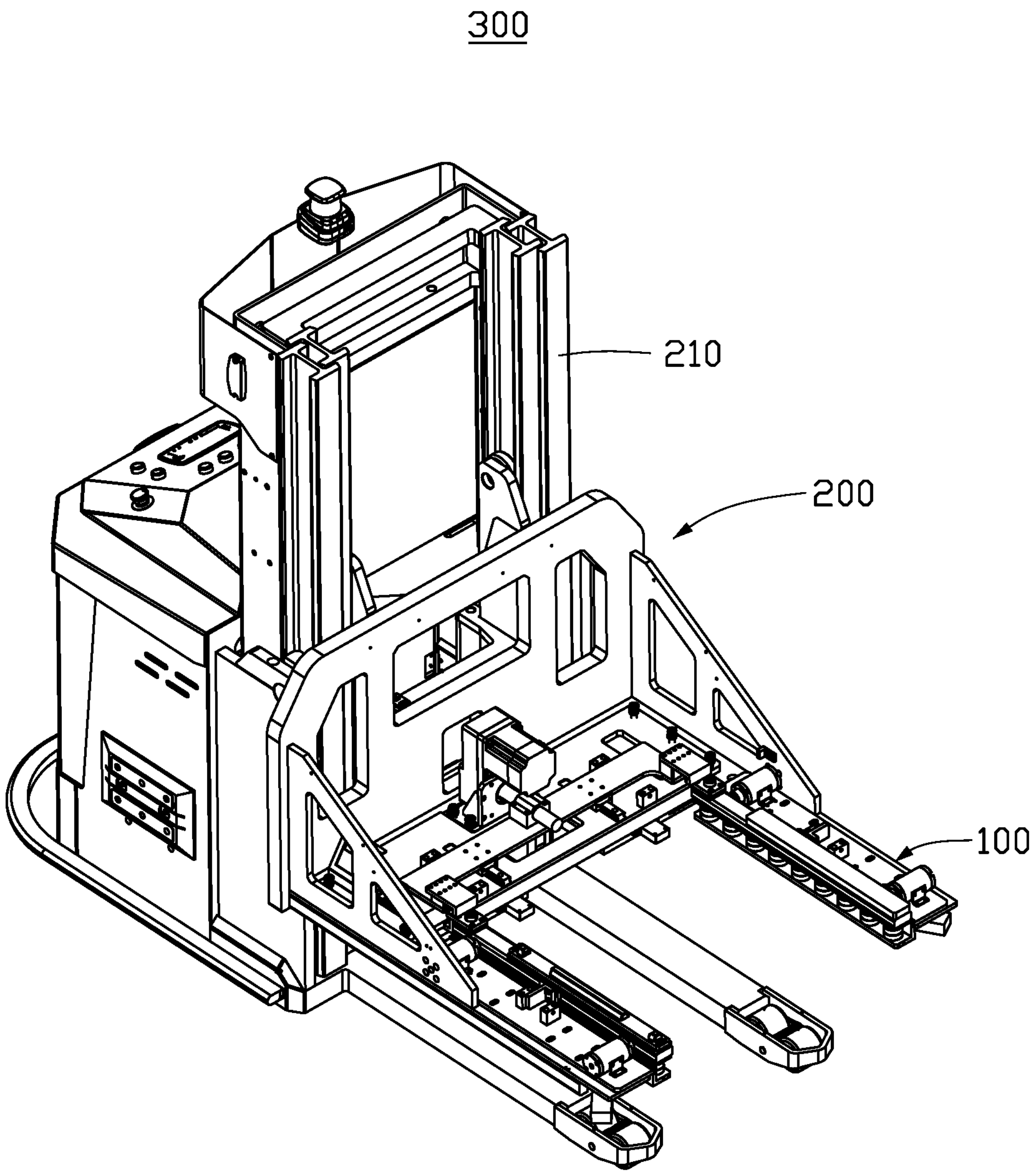
FIG. 5 is an isometric view of an Automated Guided Vehicle cart according to an embodiment of the present disclosure.

As shown in FIG. 5, an automated guided vehicle (AGV cart 300) of an embodiment includes a car 200 and the carrier 100. The car 200 includes a lift 210. The carrier 100 is mounted on the lift 210. The lift 210 can move the carrier 100 up or down.

A loading system of an embodiment includes the AGV cart 300 and the fixture 80. To unload the fixture 80, the car 200 moves to the fixture 80 until the supporting arms 20 is below the fixture 80, and the lift 210 lifts the carrier 100 to bring the supporting arms 20 close to the fixture 80. In the meantime, the drive mechanism 40 drives the supporting arms 20 move along direction X until the positioning columns 212 are aligned with the positioning grooves. After the positioning columns 212 are inserted into the positioning grooves, the lift 210 lifts the carrier 100 with the fixture 80 and the car 200 can move to its destination.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims.

What is claimed is:

1. A positioning and carrying structure comprising:

a frame;

at least two supporting arms located on the frame and movable relative to the frame along a direction X; and a plurality of press components located on the frame, wherein each of the plurality of press components comprises:

a first ball located on a side of a supporting arm of the at least two supporting arms away from another supporting arm of the at least two supporting arms, and the first ball configured to push the supporting arm elastically along a direction Y, wherein the direction Y is substantially perpendicular to the direction X, the plurality of press components is arranged along the direction X on the side of each of the at least two supporting arms.

2. The positioning and carrying structure of claim 1, further comprising a drive mechanism, wherein:

the drive mechanism comprises a motor, a transmission assembly and a moving arm, the transmission assembly is connected to the motor and the moving arm, the moving arm is located on the frame and movable relative to the frame along the direction X, the moving arm is connected to the at least two supporting arms, the at least two supporting arms move with the moving arm.

3. The positioning and carrying structure of claim 2, wherein:

a gap is defined between the moving arm and the each of the at least two supporting arms in the direction X, the each of the at least two supporting arms is configured to change a position relative to the moving arm;

an adjusting bolt is connected between the moving arm and the each of the at least two supporting arms to fix a position of the each of the at least two supporting arms relative to the moving arm.

4. The positioning and carrying structure of claim 1, further comprising a positioning plate, wherein:

the positioning plate is located on the each of the at least two supporting arms the positioning plate is provided with a positioning column, the positioning column is configured for positioning an object to be transported.

5. The positioning and carrying structure of claim 1, further comprising:

a plurality of support components arranged on the frame along the direction X below each of the at least two supporting arms, wherein:

each of the plurality of support components comprises:

a second ball located below the each of the at least two supporting arms to support the each of the at least two supporting arms.

6. The positioning and carrying structure of claim 1, wherein:

each of the plurality of press components comprises:

a shell;

an elastic member accommodated in the shell;

a guidepost accommodated in the shell;

one end of the elastic member rests against the inner wall of the shell, and another end of the elastic member bears against the guidepost, an end of the guidepost away from the elastic member is connected with the first ball.

7. The positioning and carrying structure of claim 6, wherein:

the frame comprises at least one adjusting groove, the shell is inserted in one adjusting groove of the at least one adjusting groove, a corresponding press component of the plurality of press components is configured change a position relative to the frame by adjusting the shell within the adjusting groove.

8. The positioning and carrying structure of claim 1, further comprising:

a limit switch located on the frame between the at least two supporting arms.

9. An automated guided vehicle comprising:

a car;

a positioning and carrying structure located on the car, wherein the positioning and carrying structure comprises:

a frame;

at least two supporting arms located on the frame, movable relative to the frame along a direction X; and at least one press component located on the frame, wherein each of the at least one press component comprises:

a first ball located on a side of a supporting arm of the at least two supporting arms away from another supporting arm of the at least two supporting arms, and the first ball configured to push the supporting arm elastically along a direction Y, wherein the direction Y is substantially perpendicular to the direction X, the at least one press component is arranged along the direction X on the side of each of the at least two supporting arms.

10. The automated guided vehicle of claim 9, wherein: the positioning and carrying structure further comprises a drive mechanism, the drive mechanism comprising a motor, a transmission assembly and a moving arm, the transmission assembly is connected to the motor and the moving arm, the moving arm is located on the frame and movable relative to the frame along the direction X, the moving arm is connected to the at least two supporting arms, the at least two supporting arms move with the moving arm.

11. The automated guided vehicle of claim 10, wherein:

a gap is defined between the moving arm and the each of the at least two supporting arms in the direction X, the each of the at least two supporting arms is configured to change a position relative to the moving arm;

an adjusting bolt is connected between the moving arm and the each of the at least two supporting arms to fix a position of the each of the at least two supporting arms relative to the moving arm.

12. The automated guided vehicle of claim 9, wherein: the positioning and carrying structure further comprises a positioning plate, the positioning plate is located on the each of the at least two supporting arms, the positioning plate is provided with a positioning column, the positioning column is configured for positioning an object to be transported.

13. The automated guided vehicle of claim 9, wherein:

each of the support components comprises:

a second ball located below the each of the at least two supporting arms to support the each of the at least two supporting arms.

14. The automated guided vehicle of claim 9, wherein:

each of the at least one press component comprises:

a shell;

an elastic member accommodated in the shell;

a guidepost accommodated in the shell;

one end of the elastic member rests against the inner wall of the shell, and another end of the elastic member bears against the guidepost, an end of the guidepost away from the elastic member is connected to the first ball.

15. The automated guided vehicle of claim 14, wherein:

the frame comprises at least one groove, the shell is inserted in one groove of the at least one groove, a corresponding press component of the at least one press component is configured to change a position relative to the frame by adjusting the shell within the groove.

16. The automated guided vehicle of claim 9, wherein:

the at least one press component is arranged along the direction X on the side of each of the at least two supporting arms.

17. The automated guided vehicle of claim 9, wherein;

the positioning and carrying structure further comprises:

a limit switch located on the frame between the at least two supporting arms.

18. The automated guided vehicle of claim 9, wherein:

the car comprises a lift configured to move the positioning and carrying structure up or down.

19. A loading system comprising:

an automated guided vehicle;

a fixture comprising a positioning groove; wherein the automated guided vehicle comprises a positioning and carrying structure, wherein the positioning and carrying structure comprises:

a frame;

at least two supporting arms located on the frame, movable relative to the frame along a direction X;

a positioning plate located on each of the at least two supporting arms, the positioning plate comprising a positioning column, the positioning column is insertable into the positioning groove;

at least one press component located on the frame, wherein each of the at least one press component comprises:

a first ball located on a side of a supporting arm of the at least two supporting arms away from another supporting arm of the at least two supporting arms, and the first ball configured to push the supporting arm elastically along a direction Y;

the direction Y is substantially perpendicular to the direction X.

* * * * *